United States Patent
Chapman et al.

(10) Patent No.: US 12,517,160 B2
(45) Date of Patent: Jan. 6, 2026

(54) SYSTEMS AND METHODS FOR CONVERTING THE RESULT OF A RADIO FREQUENCY (RF) MEASUREMENT INTO THE QUANTUM CAPACITANCE OF A DEVICE

(71) Applicant: Microsoft Technology Licensing, LLC, Redmond, WA (US)

(72) Inventors: Benjamin James Chapman, Seattle, WA (US); Tareq El Dandachi, Santa Barbara, CA (US); Samantha Ho, Bellevue, WA (US); Jonne Verneri Koski, The Hague (NL); Gijsbertus De Lange, Delft (NL); Thorvald Wadum Larsen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 150 days.

(21) Appl. No.: 18/442,999

(22) Filed: Feb. 15, 2024

(65) Prior Publication Data
US 2025/0199043 A1 Jun. 19, 2025

Related U.S. Application Data

(60) Provisional application No. 63/610,926, filed on Dec. 15, 2023.

(51) Int. Cl.
*G01R 27/04* (2006.01)
*G01R 29/08* (2006.01)

(52) U.S. Cl.
CPC .............................. *G01R 29/0807* (2013.01)

(58) Field of Classification Search
CPC .. G01R 29/0807; G01R 29/24; G01R 33/035; G01R 23/12
See application file for complete search history.

(56) References Cited

U.S. PATENT DOCUMENTS

| | | | |
|---|---|---|---|
| 11,444,184 B1* | 9/2022 | Tahan | H01L 21/26513 |
| 2003/0052677 A1* | 3/2003 | Pines | G01R 33/46 |
| | | | 324/309 |
| 2014/0145735 A1* | 5/2014 | Koester | G01N 27/227 |
| | | | 324/686 |
| 2017/0262765 A1* | 9/2017 | Bourassa | H10N 60/12 |

* cited by examiner

*Primary Examiner* — Thang X Le
(74) *Attorney, Agent, or Firm* — Ranjeev Singh; Singh Law, PLLC

(57) ABSTRACT

Systems and methods for converting the result of a radio frequency (RF) measurement into the quantum capacitance of a device are described. An example method includes, by performing a radio frequency (RF) measurement, extracting frequency shift and resonator loss shift of a resonator relative to a reference trace of the resonator, where the resonator is coupled to a quantum device. The method further includes from the extracted frequency shift and the resonator loss shift, without resonator fitting, deriving both a real part and an imaginary part of a quantum capacitance associated with the quantum device.

20 Claims, 13 Drawing Sheets

```
┌─────────────────────────────────────────────────────────────────────┐
│ ACQUIRING A REFERENCE TRACE OF A RESONATOR COUPLED TO A QUANTUM     │
│ DEVICE, WHERE THE REFERENCE TRACE RELATES TO A PARAMETRIC PLOT OF   │
│ VALUES OF REAL AND IMAGINARY PARTS OF A REFLECTED SIGNAL OF THE     │
│ RESONATOR VERSUS A CORRESPONDING SIGNAL FREQUENCY                   │
└─────────────────────────────────────────────────────────────────────┘
                                  │
                                  ▼  1010
┌─────────────────────────────────────────────────────────────────────┐
│ BY CHANGING A CONTROL PARAMETER ASSOCIATED WITH THE QUANTUM DEVICE, │
│ ACQUIRING A DATA POINT TO CONVERT TO A QUANTUM CAPACITANCE          │
└─────────────────────────────────────────────────────────────────────┘
                                  │
                                  ▼  1020
┌─────────────────────────────────────────────────────────────────────┐
│ FINDING A NEAREST POINT ALONG THE REFERENCE TRACE TO THE DATA       │
│ POINT TO CONVERT                                                    │
└─────────────────────────────────────────────────────────────────────┘
                                  │
                                  ▼  1030
┌─────────────────────────────────────────────────────────────────────┐
│ BY PERFORMING THE RF MEASUREMENT, EXTRACTING A FREQUENCY SHIFT      │
│ REPRESENTED BY A TANGENTIAL TRANSLATION BETWEEN THE NEAREST POINT   │
│ AND A RESONANCE POINT ALONG THE REFERENCE TRACE AND EXTRACTING A    │
│ RESONATOR LOSS SHIFT REPRESENTED BY A RADIAL TRANSLATION BETWEEN    │
│ THE NEAREST POINT AND THE DATA POINT TO CONVERT                     │
└─────────────────────────────────────────────────────────────────────┘
                                  │
                                  ▼  1040
┌─────────────────────────────────────────────────────────────────────┐
│ FROM THE EXTRACTED FREQUENCY SHIFT AND THE RESONATOR LOSS SHIFT,    │
│ WITHOUT RESONATOR FITTING, DERIVING BOTH A REAL PART AND AN         │
│ IMAGINARY PART OF THE QUANTUM CAPACITANCE ASSOCIATED WITH THE       │
│ QUANTUM DEVICE                                                      │
└─────────────────────────────────────────────────────────────────────┘
                                     1050
```

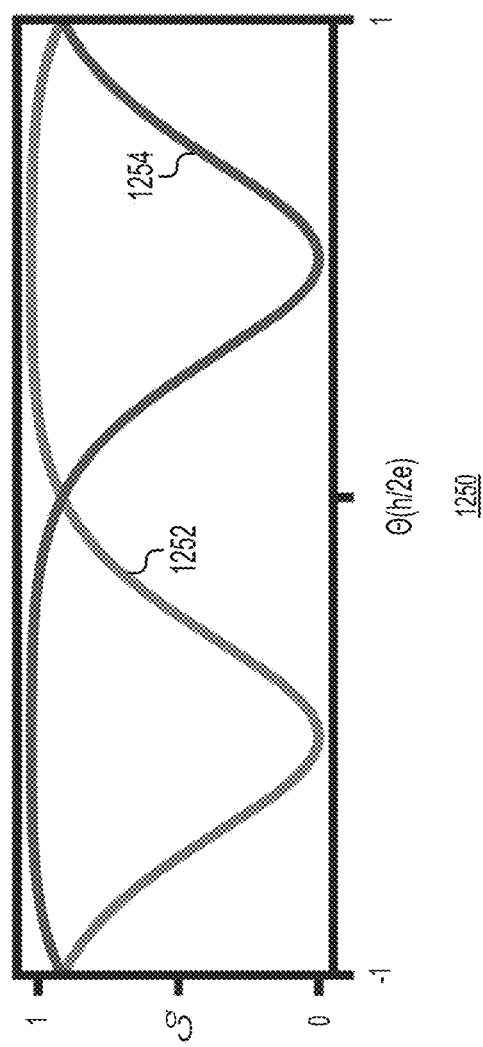
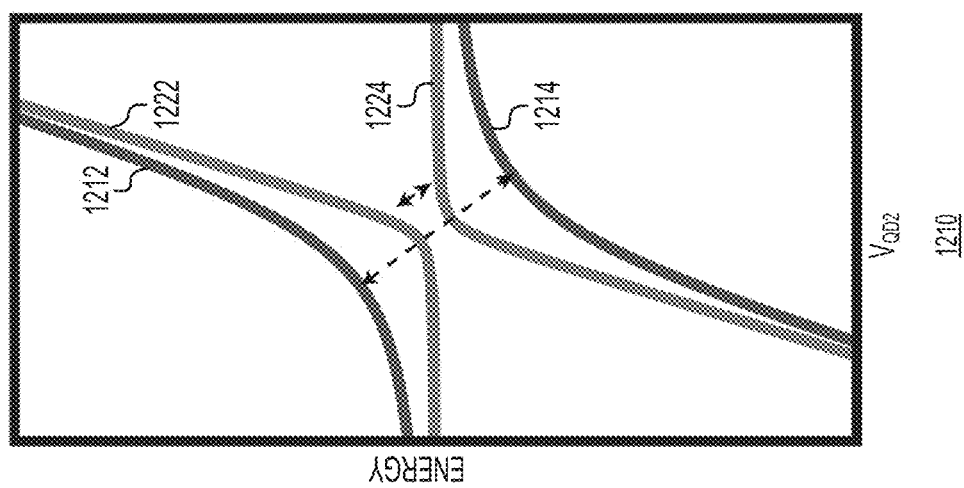
FIG. 12

SYSTEMS AND METHODS FOR CONVERTING THE RESULT OF A RADIO FREQUENCY (RF) MEASUREMENT INTO THE QUANTUM CAPACITANCE OF A DEVICE

CROSS-REFERENCE TO A RELATED APPLICATION

This application claims the benefit of U.S. Provisional Application No. 63/610,926, filed Dec. 15, 2023, titled "SYSTEMS AND METHODS FOR CONVERTING THE RESULT OF A RADIO FREQUENCY (RF) MEASUREMENT INTO A QUANTUM CAPACITANCE OF A DEVICE," the entire contents of which are hereby incorporated herein by reference.

BACKGROUND

Many devices can have both an electromagnetic capacitance and a quantum capacitance. As an example, semiconductor-superconductor hybrid devices exhibit quantum capacitance. Accurate measurement and characterization of quantum devices is a requirement for the design and fabrication of such devices. Many operating parameters of such devices depend upon the quantum capacitance of these devices.

Accordingly, there is a need for improvements to systems and methods for measurement of the quantum capacitance.

SUMMARY

In one example, the present disclosure relates to a method comprising, by performing a radio frequency (RF) measurement, extracting frequency shift and resonator loss shift of a resonator relative to a reference trace of the resonator, where the resonator is coupled to a quantum device. The method may further include from the extracted frequency shift and the resonator loss shift, without resonator fitting, deriving both a real part and an imaginary part of a quantum capacitance associated with the quantum device.

In another example, the present disclosure relates to a method for converting a result of a radio frequency (RF) measurement into a quantum capacitance of a quantum device. The method may include acquiring a reference trace of a resonator coupled to the quantum device, where the reference trace relates to a parametric plot of values of real and imaginary parts of a reflected signal of the resonator versus a corresponding signal frequency.

The method may further include, by changing a control parameter associated with the quantum device, acquiring a data point to convert to the quantum capacitance. The method may further include finding a nearest point along the reference trace to the data point to convert.

The method may further include, by performing the RF measurement, extracting a frequency shift represented by a tangential translation between the nearest point and a resonance point along the reference trace and extracting a resonator loss shift represented by a radial translation between the nearest point and the data point to convert. The method may further include from the extracted frequency shift and the resonator loss shift, without resonator fitting, deriving both a real part and an imaginary part of the quantum capacitance associated with the quantum device.

In yet another example, the present disclosure relates to a method for deriving quantum capacitance of a quantum device comprising a superconducting wire. The method may include, using electrostatic gates associated with the quantum device, forming a measurement loop including quantum dots and a portion of the superconducting wire.

The method may further include performing a radio frequency (RF) measurement based on dispersive gate sensing of the measurement loop to extract frequency shift and resonator loss shift of a resonator, coupled to the quantum device, relative to a reference trace of the resonator. The method may further include from the extracted frequency shift and the resonator loss shift, without resonator fitting, deriving both a real part and an imaginary part of a quantum capacitance associated with the quantum device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 10 is a flow chart of another method for converting the result of the RF measurement into the quantum capacitance of a device in accordance with one example;

FIG. 12 shows graphs related to the arrangement of FIG. 11; and

DETAILED DESCRIPTION

Many devices can have both an electromagnetic capacitance and a quantum capacitance. As an example, semiconductor-superconductor hybrid devices exhibit quantum capacitance. Accurate measurement and characterization of the quantum devices in terms of their quantum capacitance is a requirement for the design and fabrication of such devices.

Radio frequency (RF) resonators are used for readout of quantum devices by creating a mapping between certain properties of the quantum device to the transmission or reflection coefficient of the resonator. As an example, methods can be used to convert RF measurement into a quantum capacitance $C_Q$. Previously, quantum capacitance ($C_Q$) conversion has been performed with methods based on resonator fitting. These methods can yield both the real and the imaginary parts of the quantum capacitance (also called the quantum conductance). With the aid of a reference measurement composed of a frequency scan of the readout resonator, they allow conversion of a single IQ pair into a complex quantum capacitance.

Examples described in the present disclosure leverage symmetries and small parameters to obtain an analytical approximation for the mapping between the reflected signal and the quantum capacitance. At times, the method described herein is referred to as the "projection method," in contrast with traditional resonator fitting methods. Traditional resonator fitting methods first measure the reflection from the resonator as a function of the drive frequency and the gate voltage (different values are applied), and then fit the resonator response for each gate voltage. In noisy systems, such traditional resonator fitting methods do not perform as well as the projection method described herein in terms of the accuracy of both the inferred frequency shift and the inferred resonator loss.

Figure 1:
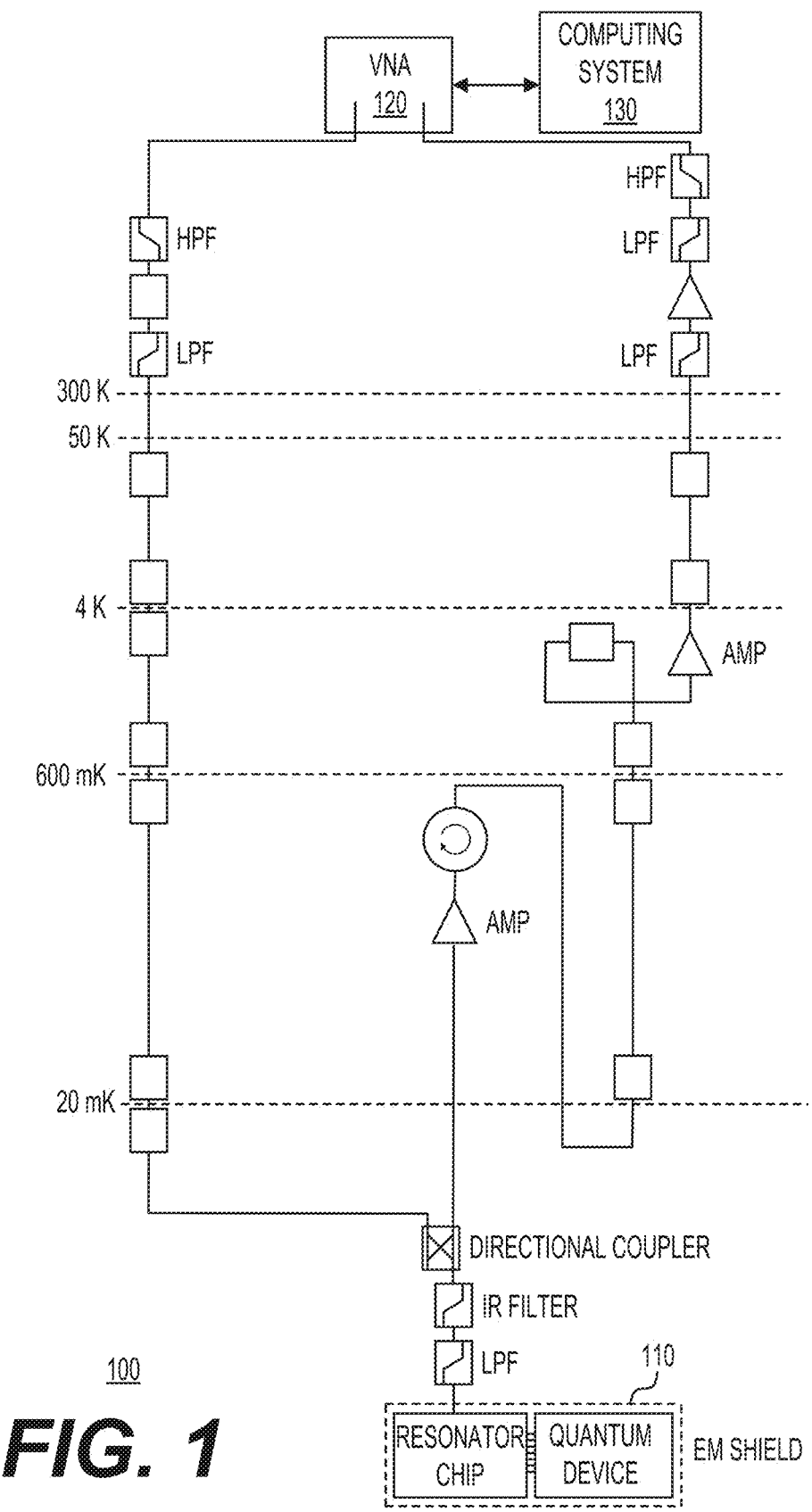
FIG. 1 is a block diagram of a system for converting the result of a radio frequency (RF) measurement into the quantum capacitance of a device in accordance with one example.

FIG. 1 is a block diagram of a system environment 100 for converting the result of a radio frequency (RF) measurement into the quantum capacitance of a device in accordance with one example. System environment 100 includes a quantum system 110, which includes an electromagnetic (EM) shield, which encloses a resonator chip and a quantum device. The quantum device may be any mesoscopic device that has a quantum capacitance associated with it. As an example, hybrid semiconductor-superconductor devices are examples of quantum devices that can be used as part of quantum computers. Some of the quantum devices may comprise a 2-dimensional gas (2DEG), which may be manufactured by forming a series of layers of semiconductors on a substrate (e.g., using any of indium phosphide (InP), indium arsenide (InAs), indium antimonide (InSb), mercury cadmium telluride (HgCdTe), or any appropriate combination of materials selected from groups II, III, IV, V, or VI of the periodic table, or any ternary compounds of three different atoms of materials selected from groups II, III, IV, V, or VI of the periodic table). Other quantum devices may include nanowires or networks of nanowires. Additional quantum devices may include topological quantum devices with quantum dots, chains of quantum dots, and regions for inducing Majorana zero modes.

System environment 100 further includes a series of components and interconnects forming a thermal hierarchy from temperatures in the range of 20 milli-kelvin (mK) to 300 K. These components and interconnects allow both the transmission of signals from a vector network analyzer (VNA) 120 to quantum system 110 and the reception of signals by VNA 120 transmitted from quantum system 110. The VNA 120 is further coupled to a computing system 130, which includes instructions stored in a memory for performance of the steps associated with obtaining the analytical mapping between the reflected signal and the quantum capacitance of the quantum device included in the quantum system 110. One or more dilution refrigerators, not shown, may be used to maintain temperatures at or below 600 mK. In addition, some of the components may be housed in a housing (not shown) that maintains a vacuum. Although FIG. 1 shows the system environment 100 having a certain number of components and interconnects that are arranged in a certain manner, system environment 100 may include additional or fewer components and interconnects arranged differently. As an example, the quantum system 110 may not include a resonator chip. Instead, the quantum device may include components that provide similar functionality.

Figure 2:
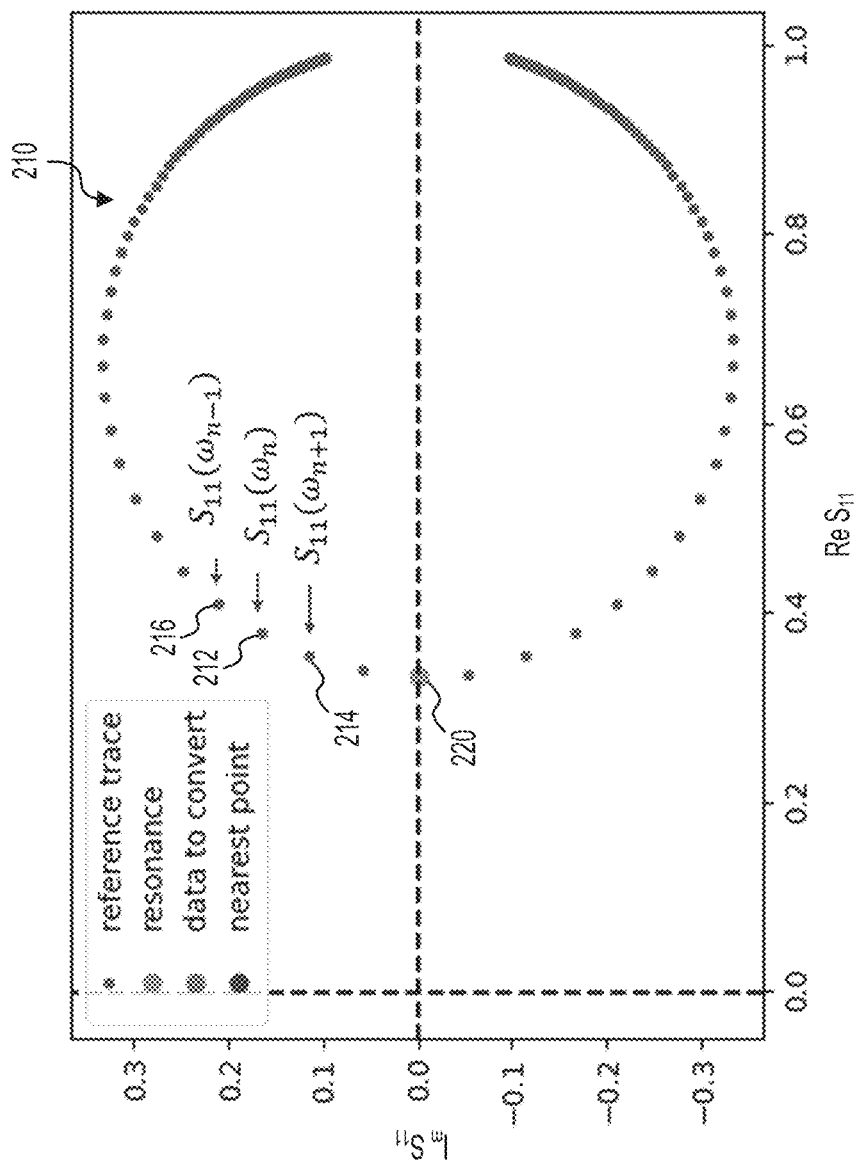
FIG. 2 is a view of a part of the process for converting the result of the RF measurement into the quantum capacitance of a device in accordance with one example.

FIG. 2 is a view 200 of a part of the process for converting the result of the RF measurement into the quantum capacitance of a device in accordance with one example. Depending on the type of quantum device being characterized, the signal frequencies being used for the RF measurement may range from tens of megahertz to tens of gigahertz. The first step in the conversion process is to determine the change in the resonance frequency ($\delta\omega_0$) and the loss rate $\delta\kappa_{int}$ relative to the reference trace 210. Thus, as part of the first part of the process, the reference trace 210 of the reflection signal ($S_{11}$) versus the signal frequency is acquired. The reference trace 210 includes points that show the values of the reflection signal $S_{11}$ versus the signal frequency. The reference trace 210 includes, among other points, point 212 (corresponding to measurement signal frequency $\omega_n$), point 214 (corresponding to measurement signal frequency $\omega_{n+1}$), and point 216 (corresponding to measurement signal frequency $\omega_{n-1}$). The reference trace 210 further shows point 220 which corresponds to the resonance frequency ($\omega_0$). In sum, the reference trace 210 provides a look-up table of the reflection coefficients measured at different amounts of frequency detuning.

The change in the resonance frequency ($\delta\omega_0$) is detected by using equation 1 (Eq. 1), as follows: after correction of electrical delay, the reflection signal ($S_{11}$) of a readout resonator with resonant frequency wo, internal loss rate $\kappa_{int}$, external loss rate $\kappa_{ext}$, and total linewidth $\kappa=\kappa_{int}+\kappa_{ext}$ is $$S_{11} = 1 - \frac{2\kappa_{ext}/\kappa}{1 + 2i(\omega-\omega_0)/\kappa}.$$

As shown above, Eq. 1 depends on the measurement signal frequency ($\omega$) and the resonance frequency ($\omega_0$) only through their difference ($\omega-\omega_0$). This implies that the change in the reflection signal ($S_{11}$) from a small shift in the resonance frequency ($\omega_0$) is identical to the change resulting from an equal and opposite detuning of the measurement signal frequency ($\omega$). Although the shift in the resonance frequency ($\omega_0$) need not be small, non-idealities like the background ripple in the microwave receiver or any uncorrected electrical delay may break the symmetry on which this argument rests.

In one example, to remedy the conversion inaccuracy caused by the non-idealities associated with the microwave receiver during the measurement of the IQ pair to be converted with a probe frequency ($\omega \neq \omega_0$), the IQ data can be transformed before performing the Co conversion procedure. This transformation starts by rotating around the center of the resonance circle in the IQ space by arg $S_{11}(\omega_0)$–arg $S_{11}(\omega)$. The center of the circle can be determined by fitting an arc near resonance using an algebraic fit, such as Pratt's method. The data is then scaled by the ratio of point densities $\delta\omega/\delta S_{11}^{tan}$ at $\omega_0$ and $\omega$ to account for the frequency-dependent phasal density of IQ pairs.

Figure 3:
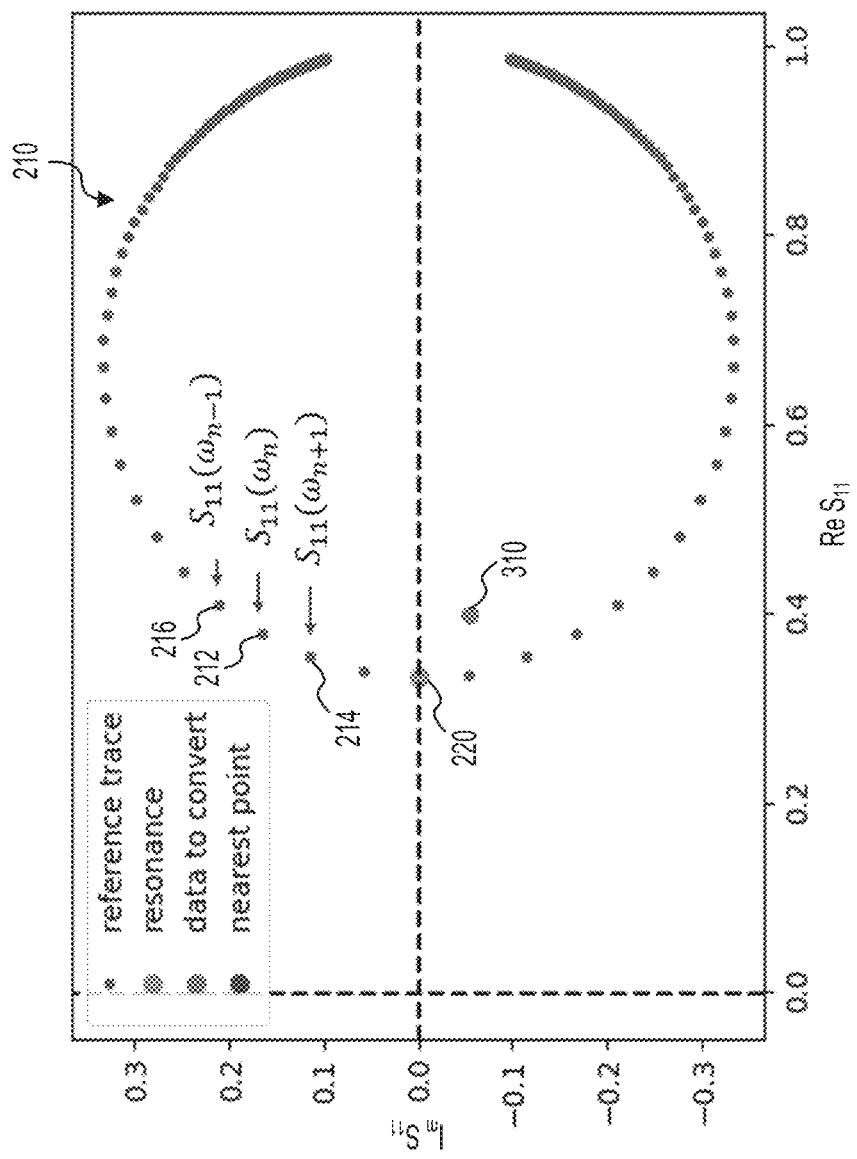
FIG. 3 is a view of another part of the process for converting the result of the RF measurement into the quantum capacitance of a device in accordance with one example.

FIG. 3 is a view 300 of another part of the process for converting the result of the RF measurement into the quantum capacitance of a device in accordance with one example. Unless indicated otherwise, the same or similar aspects of view 300 that are shown in FIG. 3 are referred to using the same reference numbers as used for the view 200 of FIG. 2. As part of this step, by changing a knob (e.g., the plunger gate voltage associated with a quantum device), the reflection signal ($S_{11}$) data (e.g., as shown by point 310) to convert into the quantum capacitance is obtained. As an example, the plunger gate voltage may be used to control the charge density in a semiconductor portion under aluminum in a nanowire. In another example, the knob may relate to a different type of voltage (e.g., a gate voltage) for a transistor type of device. The knob can be viewed as a control parameter that allows the control of a certain aspect of the quantum device.

Figure 4:
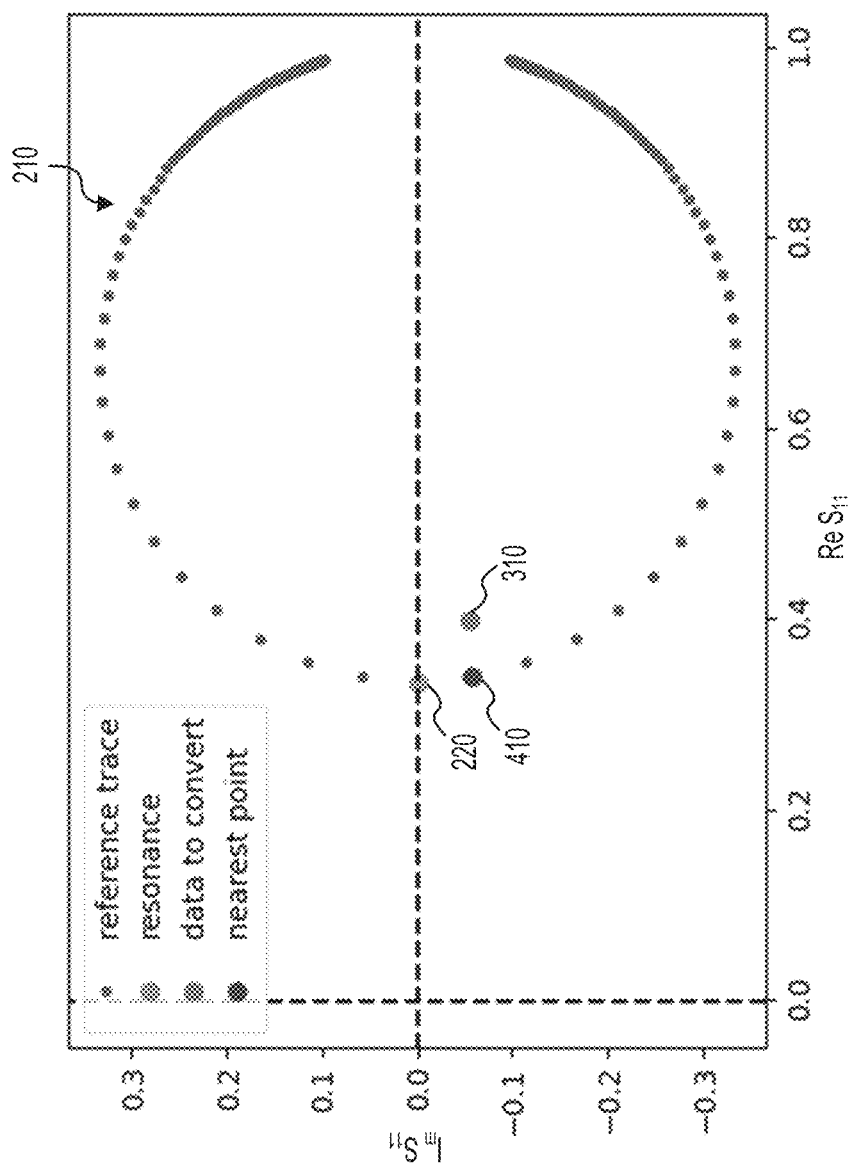
FIG. 4 is a view of another part of the process for converting the result of the RF measurement into the quantum capacitance of a device in accordance with one example.

FIG. 4 is a view 400 of another part of the process for converting the result of the RF measurement into the quantum capacitance of a device in accordance with one example. Unless indicated otherwise, the same or similar aspects of view 400 that are shown in FIG. 4 are referred to using the same reference numbers as used for the view 200 of FIG. 2 and view 300 of FIG. 3. To determine the shift in the resonance frequency ($\omega_0$), the point 410 on the reference trace 210 of FIG. 2 that is nearest to the IQ pair to be converted is determined. The detuning of this point from the resonance frequency ($\omega_0$) in the reference trace 210 is equal and opposite to the desired frequency shift ($\delta\omega_0$ (also referred to as $\Delta\omega_0$)).

To determine the change in the loss rate ($\kappa_{int}$) one can leverage the fact that both $$\frac{\delta\omega_0}{\kappa}, \frac{\delta\kappa_{int}}{\kappa} \ll 1.$$

By expanding Eq. 1 to first order in these small parameters, one can determine their effect on the reflection coefficient using the following equation 2:

$$\delta S_{11} \approx 2\frac{\kappa_{ext}}{\kappa}\left(\frac{\delta\kappa_{int}}{\kappa} - 2i\frac{\delta\omega_0}{\kappa}\right).$$

Figure 5:
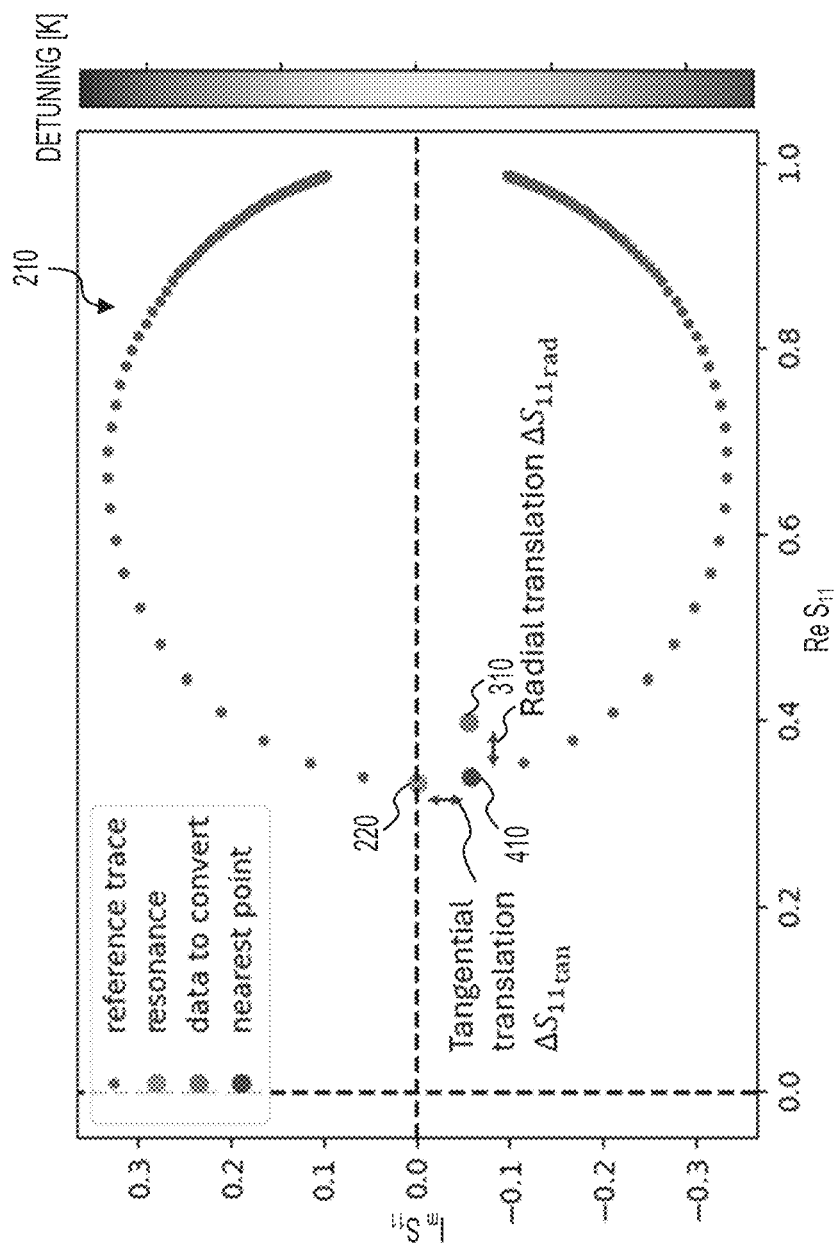
FIG. 5 shows tangential translation and radial translation in the IQ space, which are used as part of the process for converting the result of the RF measurement into the quantum capacitance of a device in accordance with one example.

In Eq. 2, the change in the loss rate (($\delta\kappa_{int}$) (also referred to as $\Delta\kappa_i$)) changes the real part of the reflection signal ($S_{11}$). As shown in view 500 of FIG. 5, geometrically the change in the loss rate ($\delta\kappa_{int}$) corresponds to a radial translation ($\delta S_{11}^{rad}$) toward or away from the circle that the reference trace 210 forms in the IQ plane. For this reason, the distance between the circle of the reference trace and the IQ pair to be converted is denoted as (($\Delta S_{11_{rad}}$) (also referred to as $\delta S_{11}^{rad}$)) in view 500 of FIG. 5. As with the determination of $\delta\omega_0$, here again the reference trace 210 can be stored as a look-up table to read off the translation in IQ space (($\Delta S_{11_{rad}}$) (also referred to as $\delta S_{11}^{rad}$)) from a small (relative to K) detuning $\delta\omega$. One can denote the translation with the superscript 'tan' because it is tangential to the circle of the reference trace. The change in the loss rate is then $$\delta\kappa_{int} \approx 2\frac{\delta\omega}{\delta S_{11}^{tan}}\delta S_{11}^{rad}.$$

In practice, the selection of $\delta\omega$ involves a tradeoff—it should be chosen to be as large as possible (to reduce inaccuracies from readout noise) while also being much less than the linewidth $\kappa$ (to reduce inaccuracies from the series expansion). In one example, $\delta\omega \approx \kappa/20$ could be used. Moreover, the accuracy of converting the result of the RF measurement into the quantum capacitance may degrade with large electrical delay inaccuracy (e.g., delay inaccuracy exceeding 10 nano-seconds).

Finally, to convert the computed complex frequency shifts into a complex quantum capacitance ($C_Q$) one can rely on the fact that $C_Q$ is small relative to the total capacitance C. Expanding one can have $$\frac{\delta\tilde{\omega}_0}{\omega_0} = -\frac{1}{2}\frac{C_Q}{C} + \mathcal{O}\left(\frac{C_Q}{C}\right)^2.$$

Here $\delta\tilde{\omega}_0$ denotes a complex quantity, the real part of which encodes the shift in the resonance frequency. Following convention, the imaginary part encodes $-\kappa_{int}$, such that a positive imaginary part ($I_m$) $C_Q$ corresponds to an increase in $\kappa_{int}$. Thus, one can have equations related to the real part of the quantum capacitance ($\mathcal{R}[C_Q]$) and the imaginary part of the quantum capacitance ($\mathcal{J}[C_Q]$) as:

$$\frac{\mathcal{R}[C_Q]}{C} = -2\frac{\delta\omega_0}{\omega_0}, \frac{\mathcal{J}[C_Q]}{C} = \frac{\delta\kappa_{int}}{\omega_0}.$$

The value for the capacitance (C) in these equations is computed with the knowledge of the inductance (L) of the relevant components of the system (e.g., a multiplexer chip or other components of the system that contribute to the capacitance), $C=1/(\omega_0^2 L)$. The obtained quantum capacitance can be used to improve the performance of the quantum devices. As an example, dispersive gate sensing is used for readout of solid-state quantum bits, such as superconducting qubits, spin qubits, and topological qubits. In the context of topological qubits based on Majorana zero modes (MZMs), dispersive gate sensing can be used to measure an electron tunneling rate, which represents the state of the topological qubit. In many topological qubit systems, quantum dots (or chains of QDs) are used to couple or decouple MZMs by tuning such quantum dots (or chains of QDs). By obtaining both the real and the imaginary parts of the quantum capacitance, both the transition energy and the decoherence rate of the measured quantum system can be determined more accurately. By obtaining both the real and the imaginary parts of the quantum capacitance, any uncertainties associated with the quantum dot-MZM coupling can be empirically characterized and analyzed. In addition, electron temperature of such devices can also be characterized.

As explained earlier, traditional resonator fitting methods first measure the reflection from the resonator as a function of the drive frequency and the gate voltage (different values are applied), and then fit the resonator response for each gate voltage. In noisy systems, such traditional resonator fitting methods do not perform as well as the projection method described herein in terms of the accuracy of both the inferred frequency shift and the inferred resonator loss. The relatively poor performance of the traditional resonator fitting methods, in part, stems from the fact that system environment 100 includes multiple interfaces (e.g., from one thermal hierarchy to another (from 300 K to 20 mK)) among various types of interconnects or cables. Each of these interfaces may have manufacturing or other imperfections, causing small reflections to occur at such interfaces. These reflections may interact with each other constructively or destructively, creating an unpredictable ripple in the reflected signals and distortion of the parametric real and imaginary parts in the IQ space.

Figure 6:
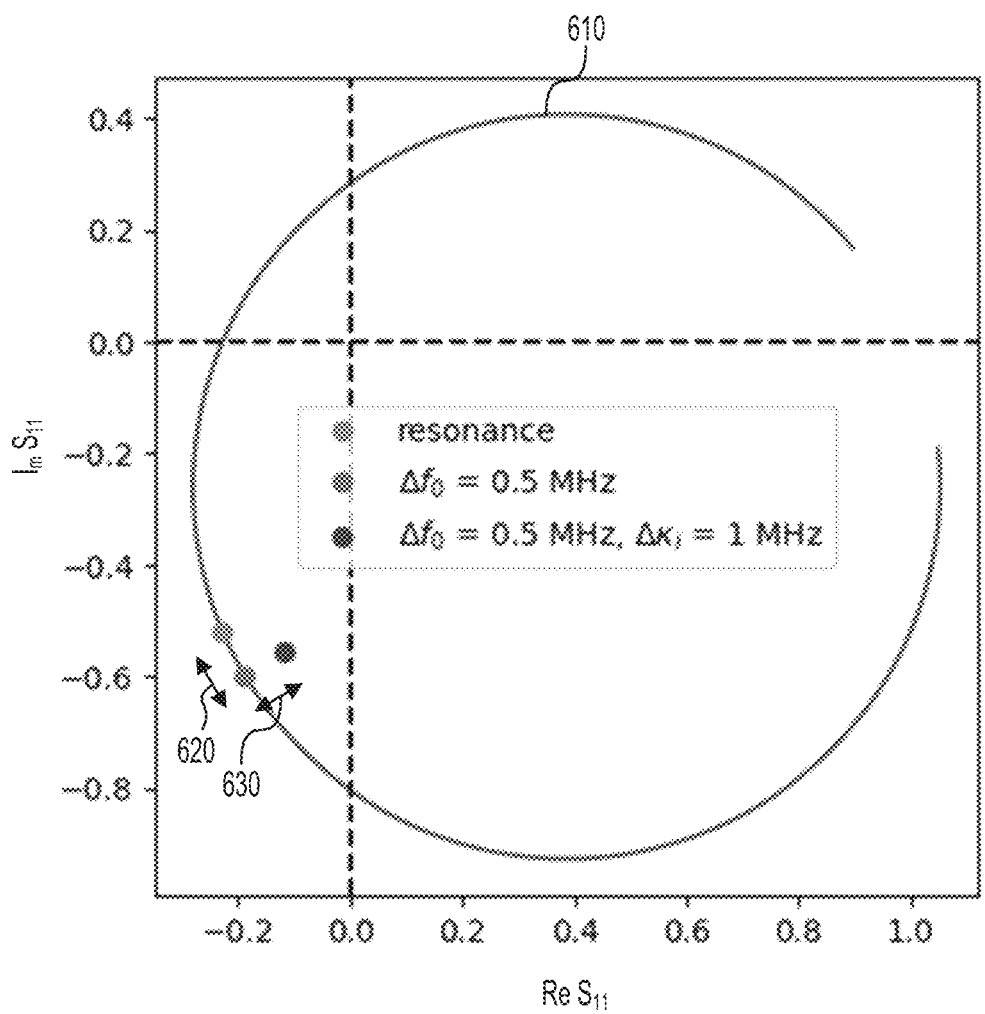
FIG. 6 is a view illustrating how small changes in the frequency and the resonator loss create orthogonal shifts in the IQ space, which are used as part of the measurement of the quantum capacitance in accordance with one example.

FIG. 6 is a view 600 illustrating how small changes in the frequency and the resonator loss create orthogonal shifts in the IQ space, which can be used as part of the measurement of the quantum capacitance in accordance with one example. As shown in view 600, small changes in the resonance frequency and the resonator loss create orthogonal shifts in the IQ space. The IQ translation 620 parallel to the reference trace 610 relates to the small change in the frequency relative to the resonance frequency. This change encodes the real part of the quantum capacitance. The IQ translation 630 perpendicular to the reference trace 610 relates to the small change in the resonator loss. This change encodes the imaginary part of the quantum capacitance. As a result, advantageously, both the real part of the quantum capacitance and the imaginary part of the quantum capacitance can be obtained without fitting the resonator trace.

Figure 7:
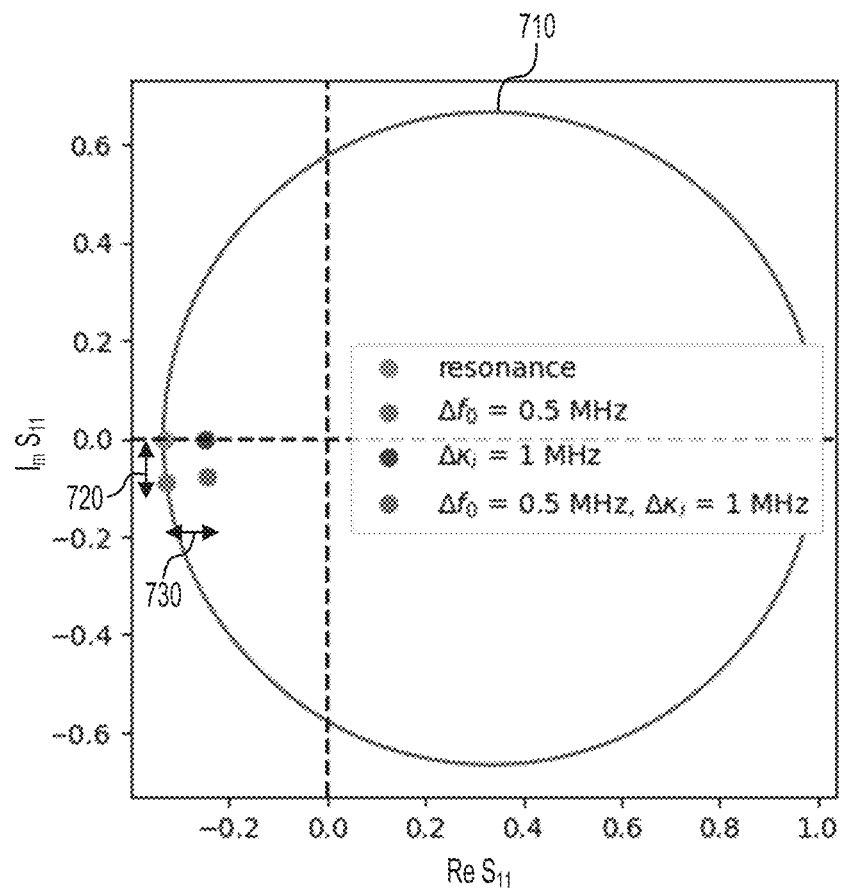
FIG. 7 is a view illustrating a geometric interpretation of the process for converting the result of the RF measurement into the quantum capacitance of a device in accordance with one example.

FIG. 7 is a view 700 illustrating a geometric interpretation of the process for converting the result of the RF measurement into the quantum capacitance of a device in accordance with one example. As shown in view 700, the mapping from the changes in the real part of the reflection signal ($S_{11}$) to the imaginary part of the quantum capacitance ($C_Q$) is the same (up to the minus sign) as the mapping from the changes in the imaginary part of the reflection signal ($S_{11}$) to the real part of the quantum capacitance ($C_Q$). Thus, the projection method provides a calibration between $\Delta f_0$ and the IQ translation 720 along the reference trace 710, which can be transformed into the real part of the quantum capacitance ($C_q$). Similarly, the projection method provides a calibration between $\Delta \kappa_i$ and the IQ translation 730 perpendicular to the reference trace 710, which can be transformed into the imaginary part of the quantum capacitance ($C_q$).

Figure 8:
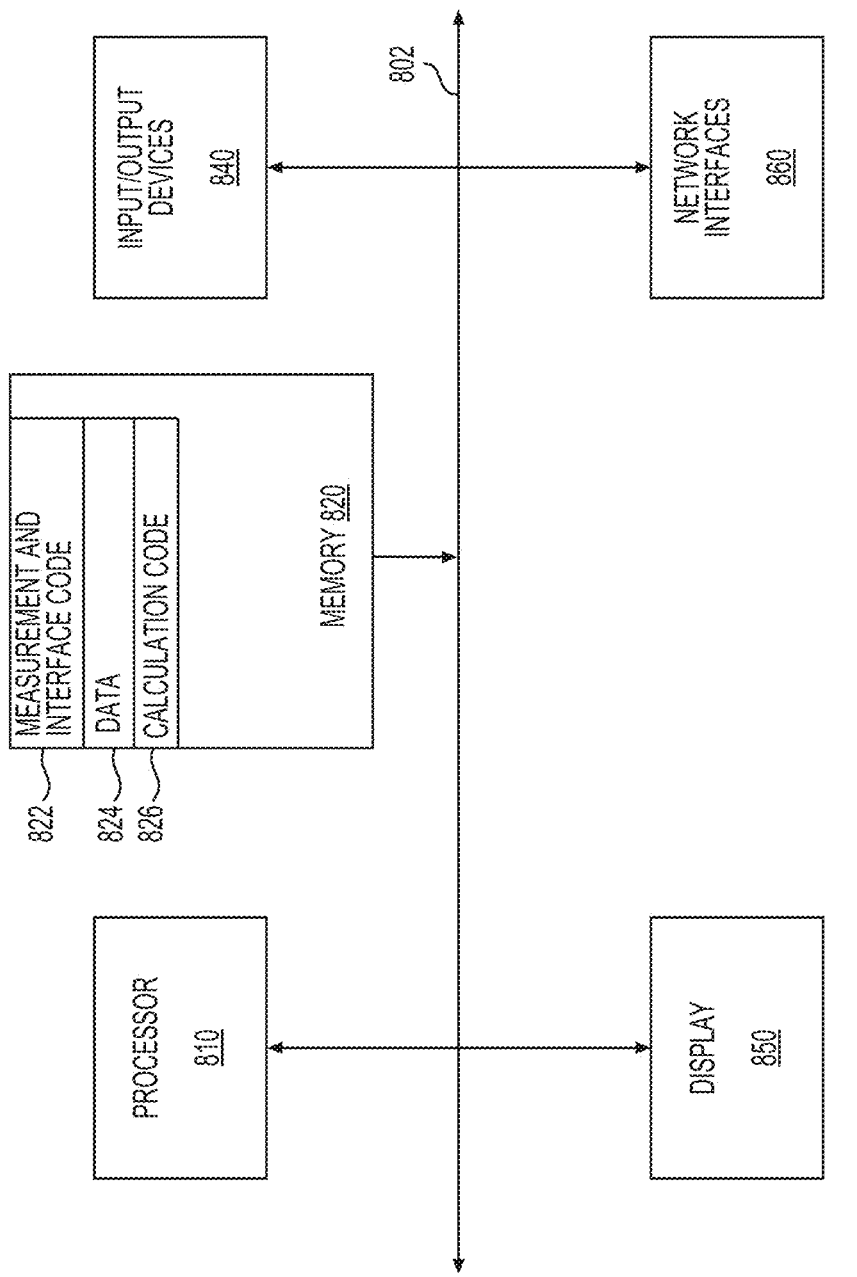
FIG. 8 is a block diagram of a computing system associated with the system environment of FIG. 1 for converting the result of the RF measurement into the quantum capacitance of a device in accordance with one example.

FIG. 8 is a block diagram of a computing system 800 associated with the system environment 100 of FIG. 1 for converting the result of the RF measurement into the quantum capacitance of a device in accordance with one example. Computing system 800 may include a processor 810, a memory 820, input/output devices 840, display 850, and network interfaces 860 interconnected via bus system 802. Memory 820 may include measurement and interface code 822, data 824 (including lookup tables, reference trace data points, and other relevant data), and calculation code 826. Measurement and interface code 822 may include program instructions that, when executed by processor 810, allow computing system 800 to interface with VNA 120 of FIG. 1. In addition, measurement and interface code 822 may include libraries or other code for allowing computing system 800 to display relevant information on display 850. Measurement and interface code 822 may also allow input/output devices 840 to receive or transmit information associated with converting the result of the RF measurement into the quantum capacitance. As an example, computing system 800 may receive trace data and other data from VNA 120 of FIG. 1 via input/output devices 840 with the help of the execution of the measurement and interface code 822. Measurement and interface code 820 may also operate in conjunction with VNA 120 of FIG. 1 to allow a user to control the knob (e.g., plunger voltage) associated with the RF measurement.

Calculation code 826 may include instructions for executing steps described earlier with respect to converting the result of the RF measurement into the quantum capacitance of a device. Calculation code 826 may also be configurable to allow for the use of computing system 800 to convert the result of the RF measurement into the quantum capacitance in environments other than system environment 100 of FIG. 1. Although FIG. 8 shows a certain number of components of computing system 800 arranged in a certain way, additional or fewer components arranged differently may also be used. In addition, although memory 820 shows certain blocks of code, the functionality provided by this code may be combined or distributed. In addition, the various blocks of code may be stored in non-transitory computer-readable media, such as non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as DRAM, SRAM, a cache, or other such media.

Figure 9:
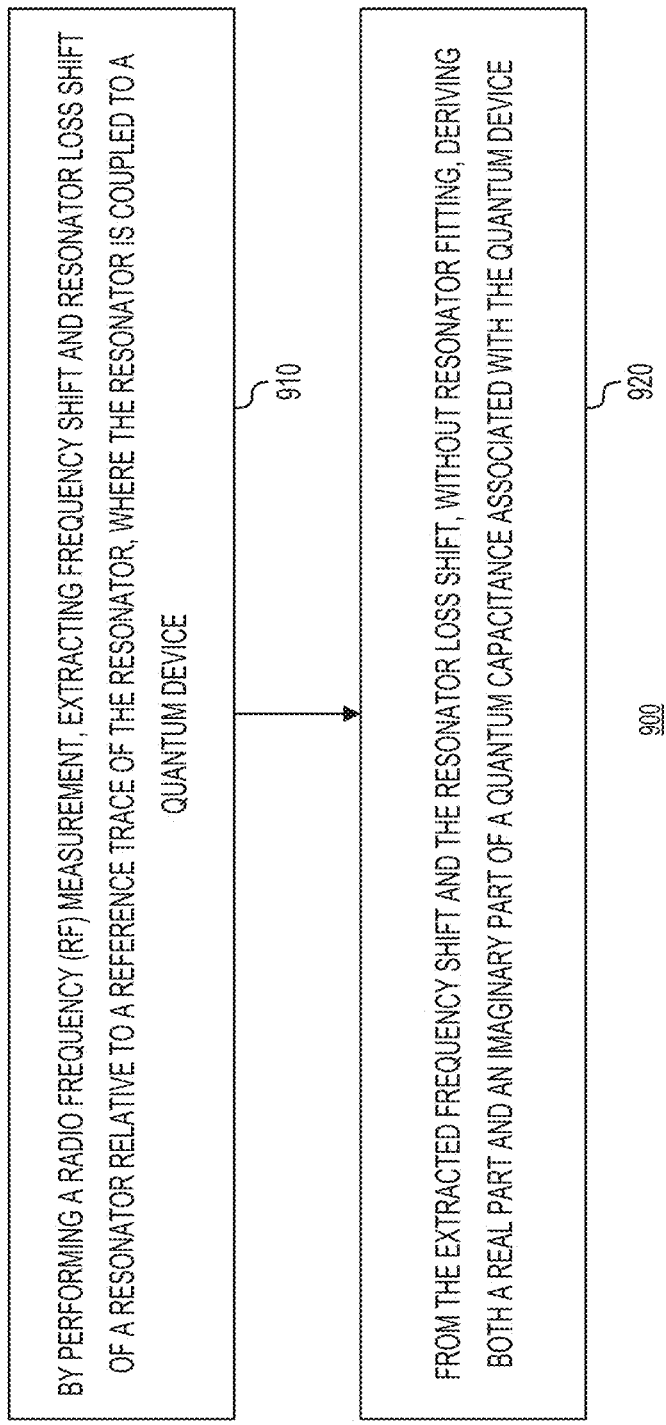
FIG. 9 is a flow chart of a method for converting the result of the RF measurement into the quantum capacitance of a device in accordance with one example.

FIG. 9 is a flow chart 900 of a method for converting the result of the RF measurement into the quantum capacitance of a device in accordance with one example. The steps associated with this step may be performed as part of system environment 100. The code and data stored in memory 820 of computing system 800 of FIG. 8 in conjunction with VNA 120 of FIG. 1 may be used to perform these steps. Step 910 comprises, by performing a radio frequency (RF) measurement, extracting frequency shift and resonator loss shift of a resonator relative to a reference trace of the resonator, where the resonator is coupled to a quantum device. As explained earlier, these shifts may be obtained by first acquiring a reference trace (e.g., 210 of FIG. 1) of a resonator coupled to the quantum device, where the reference trace relates to a parametric plot of values of real and imaginary parts of a reflected signal of the resonator versus a corresponding signal frequency. Next, by changing a control parameter (e.g., the plunger gate voltage) associated with the quantum device, a data point to convert (e.g., 310 of FIG. 3) to the quantum capacitance may be obtained. Next, a nearest point (e.g., 410 of FIG. 5) along the reference trace to the data point to convert (e.g., 310 of FIG. 5) may be obtained. Next, as explained earlier with respect to FIG. 5, a frequency shift based on a measurement associated with a tangential translation between the nearest point (e.g., 410 of FIG. 5) and a resonance point (e.g., 220 of FIG. 5) along the reference trace may be obtained. Finally, as explained earlier with respect to FIG. 5, a resonator loss shift based on a measurement associated with a radial translation between the nearest point (e.g., 410 of FIG. 5) and the data point to convert (e.g., 310 of FIG. 5) may be obtained.

Step 920 comprises, from the extracted frequency shift and the resonator loss shift, without resonator fitting, deriving both a real part and an imaginary part of a quantum capacitance associated with the quantum device. As explained earlier, using equations related to the real part of the quantum capacitance ($\mathcal{R}[C_Q]$) and the imaginary part of the quantum capacitance ($\mathcal{J}[C_Q]$) as:

$$\frac{\mathcal{R}[C_Q]}{C} = -2\frac{\delta\omega_0}{\omega_0}, \frac{\mathcal{J}[C_Q]}{C} = \frac{\delta\kappa_{int}}{\omega_0},$$

the quantum capacitance may be derived. As explained earlier, the value for the capacitance (C) in these equations is computed with the knowledge of the inductance (L) of the relevant components of the system (e.g., a multiplexer chip or other components of the system that contribute to the capacitance), $C=1/(\omega_0^2 L)$.

FIG. 10 is a flow chart 1000 of a method for converting the result of the RF measurement into the quantum capacitance of a device in accordance with one example. The steps associated with this step may be performed as part of system environment 100. The code and data stored in memory 820 of computing system 800 of FIG. 8 in conjunction with VNA 120 of FIG. 1 may be used to perform these steps. Step 1010 comprises acquiring a reference trace (e.g., 210 of FIG. 1) of a resonator coupled to the quantum device, where the reference trace relates to a parametric plot of values of real and imaginary parts of a reflected signal of the resonator versus a corresponding signal frequency.

Step 1020 comprises by changing a control parameter associated with the quantum device, acquiring a data point to convert to the quantum capacitance. As explained earlier, by changing the plunger gate voltage associated with the quantum device, a data point to convert (e.g., 310 of FIG. 3) to the quantum capacitance may be obtained. Step 1030 comprises finding a nearest point (e.g., 410 of FIG. 4) along the reference trace to the data point to convert.

Step 1040 comprises, by performing the RF measurement, extracting a frequency shift representative of a tangential translation between the nearest point and a resonance point along the reference trace and extracting a resonator loss shift representative of a radial translation between the nearest point and the data point to convert. As explained earlier with respect to FIG. 5, a frequency shift based on a measurement associated with a tangential translation between the nearest point (e.g., 410 of FIG. 5) and a resonance point (e.g., 220 of FIG. 5) along the reference trace may be obtained. As explained earlier with respect to FIG. 5, the resonator loss shift based on a measurement associated with a radial translation between the nearest point (e.g., 410 of FIG. 5) and the data point to convert may be obtained.

Step 1050 comprises from the extracted frequency shift and the resonator loss shift, without resonator fitting, deriving both a real part and an imaginary part of the quantum capacitance associated with the quantum device. As explained earlier, using equations related to the real part of the quantum capacitance ($\mathcal{R}[C_Q]$) and the imaginary part of the quantum capacitance ($\mathcal{J}[C_Q]$) as:

$$\frac{\mathcal{R}[C_Q]}{C} = -2\frac{\delta\omega_0}{\omega_0}, \frac{\mathcal{J}[C_Q]}{C} = \frac{\delta\kappa_{int}}{\omega_0},$$

the quantum capacitance may be derived. As explained earlier, the value for the capacitance (C) in these equations is computed with the knowledge of the inductance (L) of the relevant components of the system (e.g., a multiplexer chip or other components of the system that contribute to the capacitance), $C=1/(\omega_0^2 L)$.

Figure 11:
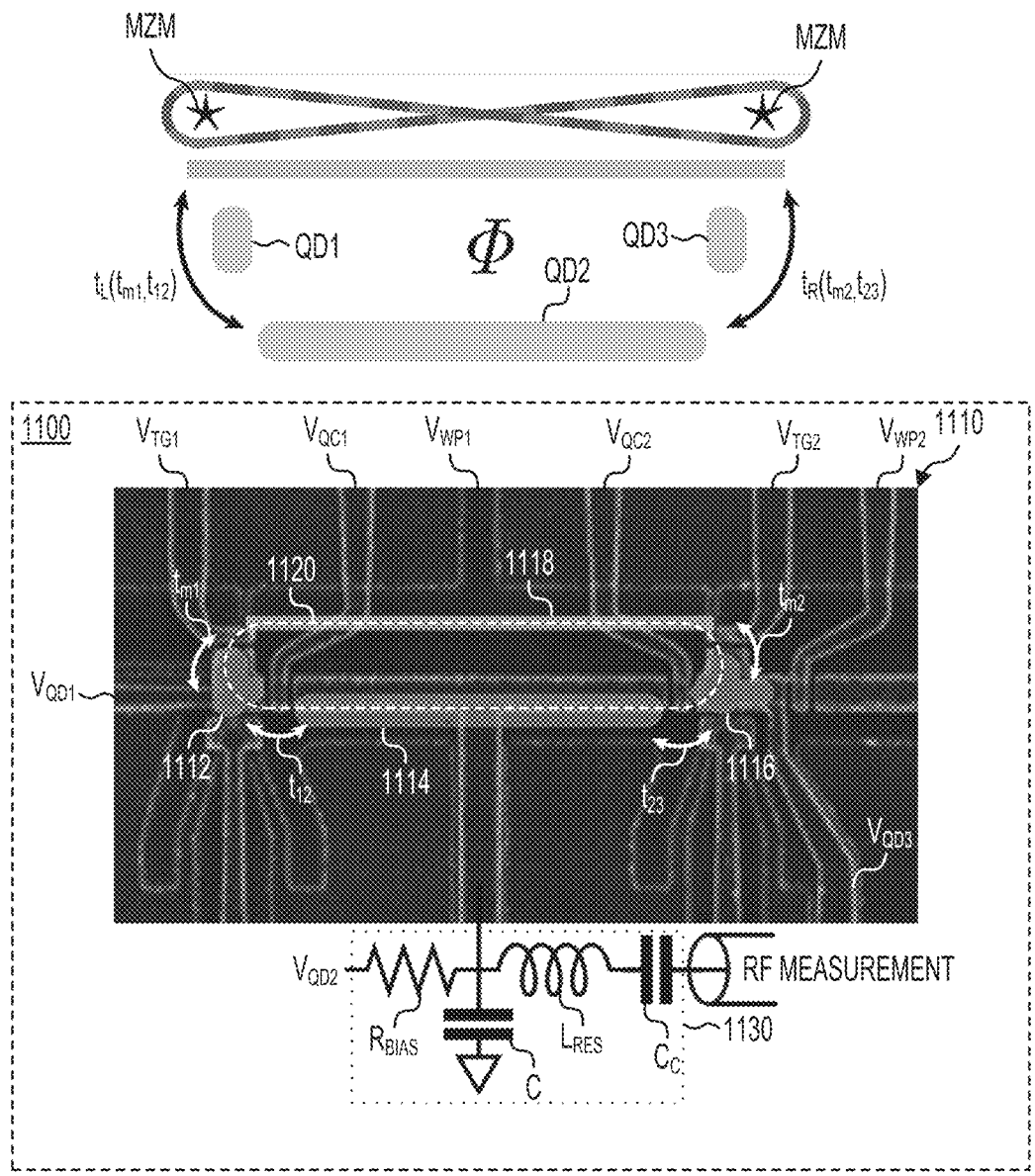
FIG. 11 shows an arrangement including a layout of a portion of a quantum device (e.g., a quantum device included as part of the quantum system of FIG. 1) capacitively coupled for RF measurement.

FIG. 11 shows an arrangement 1100 including a layout 1110 of a portion of a quantum device (e.g., a quantum device included as part of the quantum system 110 of FIG. 1) capacitively coupled for RF measurement. Layout 1100 shows portion 1110 of the quantum device coupled to a bias tee circuit 1130 for applying a DC bias. Portion 1110 of the quantum device includes an interference loop 1120 (indicated by the dashed line), which is formed by three quantum dots (quantum dot 1 1112, quantum dot 2 1114, and quantum dot 3 1116) and a gate-defined nanowire 1118. The bias tee circuit 1130 incudes a resistor $R_{BIAS}$ for coupling the voltage being supplied to quantum dot 2 1114, which is routed (via an inductor ($L_{RES}$) and a capacitor ($C_C$)) to a readout resonator for the RF measurement. Bias tee circuit 1130 further includes a capacitor (C) connected between quantum dot 2 1114 and a ground terminal.

With continued reference to FIG. 11, although not shown in FIG. 11, the complete quantum device (e.g., a linear tetron) includes additional quantum dots and other gates. As shown in FIG. 11, quantum dot 2 1114 runs parallel to the topological section of the gate-defined nanowire 1118. Moreover, each quantum dot is covered by a plunger gate (formed in a second layer, different from a first layer, of the quantum device), whose purpose is to set the electrical potential of the underlying dot based on the supplied voltage (e.g., $V_{WP1}$ and $V_{WP2}$). Quantum dot cutter gates are supplied voltages (e.g., $V_{QC1}$ and $V_{QC2}$) to control inter-dot tunnel couplings. As an example, the voltage $V_{QC1}$ is used to control the coupling between quantum dot 1 1112 and quantum dot 2 1114 and the voltage Voce is used to control the coupling between quantum dot 2 1114 and quantum dot 3 1116. Tunnel gates are supplied voltages (e.g., $V_{TG1}$ and $V_{TG2}$) to control the coupling between the quantum dots and the gate-defined nanowire 1118. The quantum dot gates are used to de-tune dot states from the Fermi energy, thereby setting the effective coupling of the Majorana zero modes (MZMs) from the wire to the quantum dots. As an example, as shown in FIG. 11, the quantum dot gates are supplied voltages (e.g., $V_{QD1}$, $V_{QD2}$ and $V_{QD3}$) for this purpose.

The operation of the RF measurement set up is based on dispersive gate sensing of a triple quantum dot interferometer (TQDI): three electrostatically defined quantum dots that together with the gate-defined wire form a loop threaded by a flux ($\phi$). In this example, the flux ($\phi$) (shown as part of the top of FIG. 11) is controlled by varying the out-of-plane magnetic field ($B_\perp$). The TQDI has two smaller dots (QD1 and QD3) connected to the ends of the gate-defined wire through tunnel couplings $t_{mi}$, where i=1, 2. The longer quantum dot (QD2) connects to the other two quantum dots through tunnel couplings ($t_{12}$ and $t_{23}$). The quantum capacitance, $C_Q$, of the longer quantum dot (QD2) is read out through dispersive gate sensing using an off-chip resonator circuit in a reflectometry setup. Once the appropriate voltages for the quantum dots (e.g., QD1 and QD3) have been determined, one can proceed with interferometer measurements. One can move through the bulk phase diagram of the nanowire by varying the in-plane field ($B_\parallel$) and the plunger gate voltage (e.g., $V_{WP1}$).

For purposes of the simulations described as part of this example, an idealized model subject to the following assumptions is used: the gate-defined wire is in the topological phase and there are no sub-gap states other than the MZMs; the charging energy and level spacing in the quantum dots are much greater than the temperature; quantum dot 1 (QD1) and quantum dot 3 (QD3) are sufficiently detuned that their influence is fully encapsulated in the effective couplings $t_L$ and $t_R$ to MZMs at the ends of the wire; the drive frequency and power are both negligible, and there are no low-energy states in the wire except for those corresponding to the fermion parity.

Referring now to FIG. 12, graph 1210 shows energy as a function of dimensionless induced charges (e.g., from voltage $V_{QD2}$) on quantum dot 2 1114 of FIG. 11 (also shown as QD2 in FIG. 11). Curves 1212, 1214, 1222, and 1224 show energies that depend on the joint parity of the MZMs. In this example, curves 1212 and 1214 correspond to even parity and curves 1222 and 1224 correspond to odd parity. In this type of arrangement shown in FIG. 11, the phase difference ($\phi$) between the couplings $t_L$ and $t_R$ to the MZMs at the ends of the wire is controlled by the magnetic flux ($\phi$) through the interference loop 1120 according to $$\phi = \left(\frac{2\pi\Phi}{\Phi_0}\right) + \phi_0,$$

where $\phi_0$ is a flux-independent offset. To capture the extent to which the change in the quantum capacitance ($C_Q$) can be used to discriminate between the two fermionic stats (e.g., Z=±1), one can introduce the measure of change in quantum capacitance $\Delta C_Q(\phi)=|C_Q(1,\phi)-C_Q(-1,\phi)|$. The interferometer should be well-balanced ($t_L \sim t_R$) in order for the $\Delta C_Q$ to be large. The total fermion parity in the quantum dot system is a function of, among other things, the MZM splitting energy ($E_M$). Graph 1250 shows changes ($\Delta C_Q$) in quantum capacitance ($C_Q$) in the presence of the finite MZM splitting energy. When the MZM splitting energy, $E_M=0$, the change in quantum capacitance ($\Delta C_Q$) exhibits a maxima along the $E_D=0$ line, with flux periodicity of h/2e. In the presence of the finite splitting energy, $E_M\neq 0$, the Z=1 maxima form an h/e-periodic arrangement along the $E_D=-2E_M$ line (e.g., as shown by curve 1252) while the Z=-1 maxima form a similar arrangement along the $E_D=2E_M$ line (as shown by curve 1254), but out of phase by a flux offset of h/2e.

Figure 13:
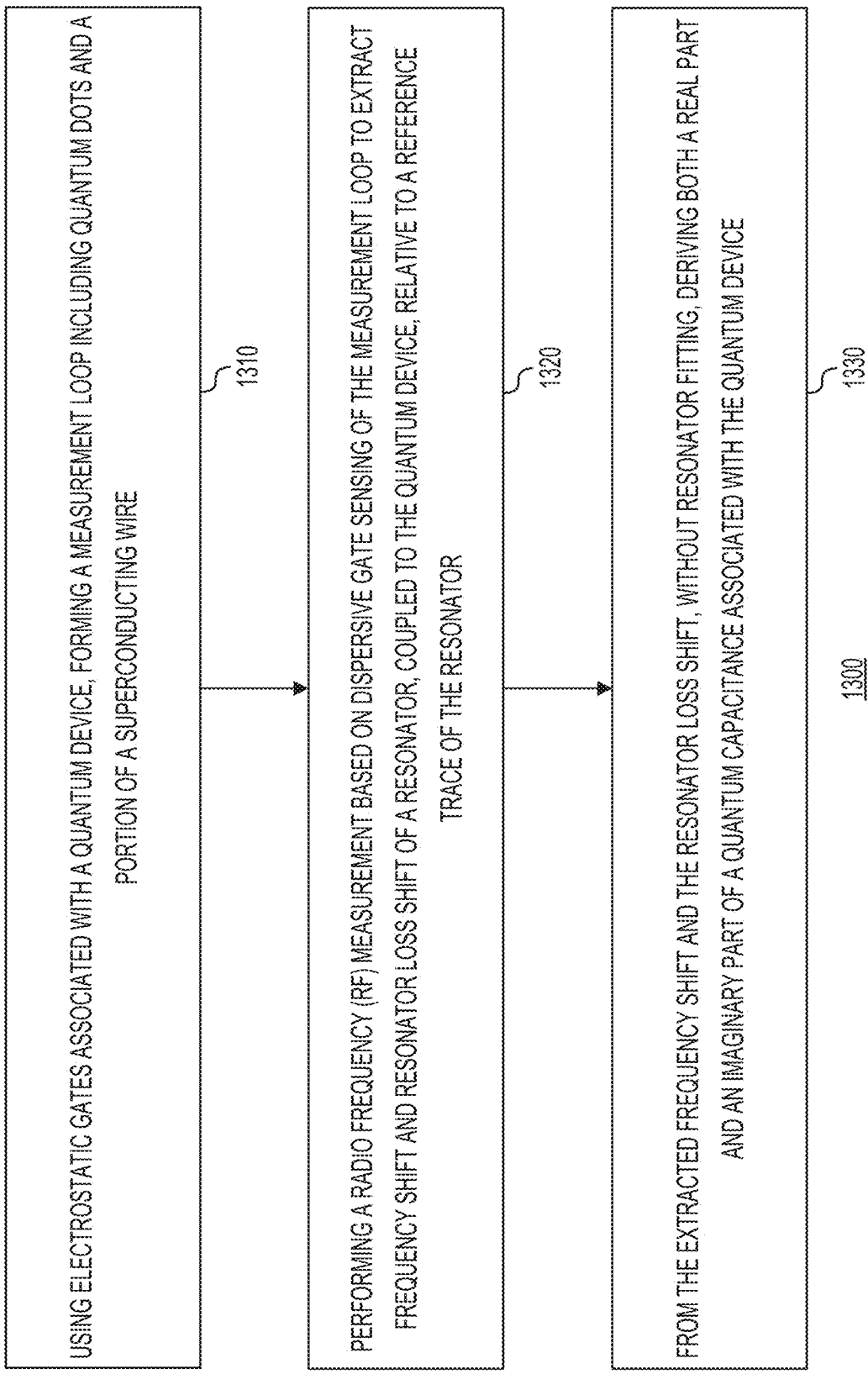
FIG. 13 shows a flow chart of a method for deriving quantum capacitance of a quantum device comprising a superconducting wire in accordance with one example.

FIG. 13 shows a flow chart 1300 of a method for deriving quantum capacitance of a quantum device comprising a superconducting wire in accordance with one example. The steps associated with this step may be performed as part of system environment 100 of FIG. 1 along with the arrangement 1100 shown in FIG. 11. The code and data stored in memory 820 of computing system 800 of FIG. 8 in conjunction with VNA 120 of FIG. 1 may be used to perform these steps. Step 1310 includes using electrostatic gates associated with the quantum device, forming a measurement loop including quantum dots and a portion of the superconducting wire. As explained earlier with respect to FIG. 11, three electrostatically defined quantum dots (e.g., QD1, QD2, and QD3) together with the gate-defined wire form a loop threaded by a flux ($\Phi$). Although this example relates to a measurement loop formed by a certain number of quantum dots, other measurement loops may include transport leads, fewer or more quantum dots, and the gate-defined wire.

Step 1320 comprises performing a radio frequency (RF) measurement based on dispersive gate sensing of the measurement loop to extract frequency shift and resonator loss shift of a resonator, coupled to the quantum device, relative to a reference trace of the resonator. As explained earlier, these shifts may be obtained by first acquiring a reference trace (e.g., 210 of FIG. 1) of a resonator coupled to the quantum device, where the reference trace relates to a parametric plot of values of real and imaginary parts of a reflected signal of the resonator versus a corresponding signal frequency. Next, by changing a control parameter (e.g., the plunger gate voltage ($V_{WP1}$ for the example shown in FIG. 11)) associated with the quantum device, a data point to convert (e.g., 310 of FIG. 3) to the quantum capacitance may be obtained. Next, a nearest point (e.g., 410 of FIG. 5) along the reference trace to the data point to convert (e.g., 310 of FIG. 5) may be obtained. Next, as explained earlier with respect to FIG. 5, a frequency shift based on a measurement associated with a tangential translation between the nearest point (e.g., 410 of FIG. 5) and a resonance point (e.g., 220 of FIG. 5) along the reference trace may be obtained. Finally, as explained earlier with respect to FIG. 5, a resonator loss shift based on a measurement associated with a radial translation between the nearest point (e.g., 410 of FIG. 5) and the data point to convert (e.g., 310 of FIG. 5) may be obtained.

Step 1330 includes, from the extracted frequency shift and the resonator loss shift, without resonator fitting, deriving both a real part and an imaginary part of a quantum capacitance associated with the quantum device. As explained earlier, using equations related to the real part of the quantum capacitance ($\mathcal{R}[C_Q]$) and the imaginary part of the quantum capacitance ($\mathcal{J}[C_Q]$) as:

$$\frac{\mathcal{R}[C_Q]}{C} = -2\frac{\delta\omega_0}{\omega_0}, \quad \frac{\mathcal{J}[C_Q]}{C} = \frac{\delta\kappa_{int}}{\omega_0},$$

the quantum capacitance may be derived. As explained earlier, the value for the capacitance (C) in these equations is computed with the knowledge of the inductance (L) of the relevant components of the system (e.g., a multiplexer chip or other components of the system that contribute to the capacitance), $C=1/(\omega_0^2 L)$.

In conclusion, the present disclosure relates to a method comprising, by performing a radio frequency (RF) measurement, extracting frequency shift and resonator loss shift of a resonator relative to a reference trace of the resonator, where the resonator is coupled to a quantum device. The method may further include from the extracted frequency shift and the resonator loss shift, without resonator fitting, deriving both a real part and an imaginary part of a quantum capacitance associated with the quantum device.

The method may further comprise acquiring the reference trace, where the reference trace relates to a parametric plot of values of real and imaginary parts of a reflected signal. The RF measurement may comprise a single radio frequency (RF) measurement.

As part of this method, deriving both the real part and the imaginary part of the quantum capacitance may comprise converting the extracted frequency shift and the resonator loss shift into the real part and the imaginary part of the quantum capacitance. The extracted frequency shift and the resonator loss shift may be smaller than the resonator linewidth.

The quantum device may comprise at least one of: (1) quantum dots coupled with topological qubits or (2) a network of quantum dots. In one example, the quantum device may comprise a hybrid semiconductor-superconductor device including a 2-dimensional gas (2DEG).

In another example, the present disclosure relates to a method for converting a result of a radio frequency (RF) measurement into a quantum capacitance of a quantum device. The method may include acquiring a reference trace of a resonator coupled to the quantum device, where the reference trace relates to a parametric plot of values of real and imaginary parts of a reflected signal of the resonator versus a corresponding signal frequency.

The method may further include, by changing a control parameter associated with the quantum device, acquiring a data point to convert to the quantum capacitance. The method may further include finding a nearest point along the reference trace to the data point to convert.

The method may further include, by performing the RF measurement, extracting a frequency shift represented by a tangential translation between the nearest point and a resonance point along the reference trace and extracting a resonator loss shift represented by a radial translation between the nearest point and the data point to convert. The method may further include from the extracted frequency shift and the resonator loss shift, without resonator fitting, deriving both a real part and an imaginary part of the quantum capacitance associated with the quantum device.

As part of this method, the RF measurement comprises a single radio frequency (RF) measurement. In addition, deriving both the real part and the imaginary part of the quantum capacitance may comprise converting the extracted frequency shift and the resonator loss shift into the real part and the imaginary part of the quantum capacitance.

Moreover, as part of this method, the control parameter may comprise a selected voltage associated with the quantum device. In one example, the selected voltage may comprise a plunger gate voltage associated with the quantum device.

The quantum device may comprise at least one of: (1) quantum dots coupled with topological qubits or (2) a network of quantum dots. In one example, the quantum device may comprise a hybrid semiconductor-superconductor device including a 2-dimensional gas (2DEG).

In yet another example, the present disclosure relates to a method for deriving quantum capacitance of a quantum device comprising a superconducting wire. The method may include, using electrostatic gates associated with the quantum device, forming a measurement loop including quantum dots and a portion of the superconducting wire.

The method may further include performing a radio frequency (RF) measurement based on dispersive gate sensing of the measurement loop to extract frequency shift and resonator loss shift of a resonator, coupled to the quantum device, relative to a reference trace of the resonator. The method may further include from the extracted frequency shift and the resonator loss shift, without resonator fitting, deriving both a real part and an imaginary part of a quantum capacitance associated with the quantum device.

The method may further include acquiring the reference trace, where the reference trace relates to a parametric plot of values of real and imaginary parts of a reflected signal. As part of this method, deriving both the real part and the imaginary part of the quantum capacitance may comprise converting the extracted frequency shift and the resonator loss shift into the real part and the imaginary part of the quantum capacitance.

The quantum device may comprise at least one of: (1) quantum dots coupled with topological qubits or (2) a network of quantum dots. In addition, the extracted frequency shift and the resonator loss shift may be smaller than the resonator linewidth.

It is to be understood that the systems, devices, methods, and components described herein are merely examples. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), and Complex Programmable Logic Devices (CPLDs). In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a device, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method comprising:
   by performing a radio frequency (RF) measurement, extracting frequency shift and resonator loss shift of a resonator relative to a reference trace of the resonator, wherein the resonator is coupled to a quantum device; and
   from the extracted frequency shift and the resonator loss shift, without resonator fitting, deriving both a real part and an imaginary part of a quantum capacitance associated with the quantum device.

2. The method of claim 1, further comprising acquiring the reference trace, wherein the reference trace relates to a parametric plot of values of real and imaginary parts of a reflected signal.

3. The method of claim 1, wherein the RF measurement comprises a single radio frequency (RF) measurement.

4. The method of claim 1, wherein the deriving both the real part and the imaginary part of the quantum capacitance comprises converting the extracted frequency shift and the resonator loss shift into the real part and the imaginary part of the quantum capacitance.

5. The method of claim 1, wherein the extracted frequency shift and the resonator loss shift are smaller than the resonator linewidth.

6. The method of claim 1, wherein the quantum device comprises at least one of: (1) quantum dots coupled with topological qubits or (2) a network of quantum dots.

7. The method of claim 1, wherein the quantum device comprises a hybrid semiconductor-superconductor device including a 2-dimensional gas (2DEG).

8. A method for converting a result of a radio frequency (RF) measurement into a quantum capacitance of a quantum device, the method comprising:
   acquiring a reference trace of a resonator coupled to the quantum device, wherein the reference trace relates to a parametric plot of values of real and imaginary parts of a reflected signal of the resonator versus a corresponding signal frequency;
   by changing a control parameter associated with the quantum device, acquiring a data point to convert to the quantum capacitance;
   finding a nearest point along the reference trace to the data point to convert;
   by performing the RF measurement, extracting a frequency shift represented by a tangential translation between the nearest point and a resonance point along the reference trace and extracting a resonator loss shift represented by a radial translation between the nearest point and the data point to convert; and
   from the extracted frequency shift and the resonator loss shift, without resonator fitting, deriving both a real part and an imaginary part of the quantum capacitance associated with the quantum device.

9. The method of claim 8, wherein the RF measurement comprises a single radio frequency (RF) measurement.

10. The method of claim 8, wherein the deriving both the real part and the imaginary part of the quantum capacitance comprises converting the extracted frequency shift and the resonator loss shift into the real part and the imaginary part of the quantum capacitance.

11. The method of claim 8, wherein the control parameter comprises a selected voltage associated with the quantum device.

12. The method of claim 11, wherein the selected voltage comprises a plunger gate voltage associated with the quantum device.

13. The method of claim 8, wherein the quantum device comprises at least one of a: (1) quantum dots coupled with topological qubits or (2) a network of quantum dots.

14. The method of claim 8, wherein the quantum device comprises a hybrid semiconductor-superconductor device including a 2-dimensional gas (2DEG).

15. The method of claim 8, wherein the extracted frequency shift and the resonator loss shift are smaller than the resonator linewidth.

16. A method for deriving quantum capacitance of a quantum device comprising a superconducting wire, the method comprising:
   using electrostatic gates associated with the quantum device, forming a measurement loop including quantum dots and a portion of the superconducting wire;
   performing a radio frequency (RF) measurement based on dispersive gate sensing of the measurement loop to extract frequency shift and resonator loss shift of a resonator, coupled to the quantum device, relative to a reference trace of the resonator; and
   from the extracted frequency shift and the resonator loss shift, without resonator fitting, deriving both a real part and an imaginary part of a quantum capacitance associated with the quantum device.

17. The method of claim 16, further comprising acquiring the reference trace, wherein the reference trace relates to a parametric plot of values of real and imaginary parts of a reflected signal.

18. The method of claim 16, wherein the deriving both the real part and the imaginary part of the quantum capacitance comprises converting the extracted frequency shift and the resonator loss shift into the real part and the imaginary part of the quantum capacitance.

19. The method of claim 16, wherein the quantum device comprises at least one of: (1) quantum dots coupled with topological qubits or (2) a network of quantum dots.

20. The method of claim 16, wherein the extracted frequency shift and the resonator loss shift are smaller than the resonator linewidth.

* * * * *